United States Patent
Wu et al.

(10) Patent No.: US 7,444,152 B2
(45) Date of Patent: Oct. 28, 2008

(54) SIGNALING AND ROUTING PROTOCOLS FOR AN INTEGRATED CELLULAR AND RELAYING SYSTEM

(75) Inventors: Hongyi Wu, Lafayette, LA (US); Chunming Qiao, Williamsville, NY (US); Sudhir S. Dixit, Weston, MA (US)

(73) Assignee: Nokia Corporation, Espoo (FI)

( * ) Notice: Subject to any disclaimer, the term of this patent is extended or adjusted under 35 U.S.C. 154(b) by 542 days.

(21) Appl. No.: 10/185,225

(22) Filed: Jun. 28, 2002

(65) Prior Publication Data
US 2004/0002336 A1 Jan. 1, 2004

(51) Int. Cl.
*H04Q 7/20* (2006.01)
(52) U.S. Cl. .................. 455/445; 455/447; 455/11.1; 455/43.8; 455/67.1; 370/337; 370/329
(58) Field of Classification Search .............. 455/13.1, 455/454, 445, 7, 67.11, 561, 525, 524, 442, 455/11.1; 370/351, 352, 336, 329
See application file for complete search history.

(56) References Cited

U.S. PATENT DOCUMENTS

| | | | |
|---|---|---|---|
| 5,504,935 A * | 4/1996 | Vercauteren | 455/438 |
| 5,850,593 A * | 12/1998 | Uratani | 455/11.1 |
| 6,370,384 B1 * | 4/2002 | Komara | 455/447 |
| 6,728,231 B1 * | 4/2004 | Sugaya et al. | 370/336 |
| 6,731,905 B2 * | 5/2004 | Ogino et al. | 455/11.1 |
| 2001/0055286 A1 * | 12/2001 | Lin et al. | 370/329 |
| 2002/0107024 A1 * | 8/2002 | Dev Roy | 455/447 |
| 2003/0013503 A1 | 1/2003 | Menard | |
| 2003/0068975 A1 * | 4/2003 | Qiao et al. | 455/11.1 |
| 2003/0109217 A1 | 6/2003 | Reed | |
| 2003/0134598 A1 * | 7/2003 | Sendrowicz | 455/67.1 |

FOREIGN PATENT DOCUMENTS

| | | |
|---|---|---|
| EP | 1113592 | 7/2001 |
| GB | 2326059 | 12/1998 |

OTHER PUBLICATIONS

Hongyi Wu, Chunming Qiao and Sudhir Dixit, "*Distributed Signaling and Routing Protocols in ICAR (Integrated Cellular and Ad hoc Relaying System)*", Fourth International Symposium on Wireless Personal Multimedia Communications (WPMC'01), pp. 791-801, Aalborg, Denmark, Sep. 9-12, 2001.

Hongyi Wu, Chunming Qiao and Ozan Tonguz, "*A New Generation Wireless System with Integrated Cellular and Mobile Relaying Technologies*", International Conference on Broadband Wireless Access Systems (WAS' 2000), pp. 55-62, San Francisco, CA, Dec. 4-6, 2000.

Chunming Qiao, Hongyi Wu and Ozan Tonguz, "*ICAR: an Integrated Cellular and Ad hoc Relay System*", IEEE International Conference on Computer Communications and Networks (IC3N'00), pp. 154-161, Las Vegas, NV, Oct. 2000.

* cited by examiner

*Primary Examiner*—David Q Nguyen
(74) *Attorney, Agent, or Firm*—Banner & Witcoff, Ltd.

(57) ABSTRACT

The present invention provides signaling protocols that enable an integrated cellular relaying system to support a call for a wireless terminal. In embodiments of the invention, the wireless terminal is redirected to a relaying path corresponding to at least one relaying station. A relaying station communicates with the wireless terminal and with other relaying stations. In addition, one of the relaying stations (that is configured in the relaying path) completes the relaying path by communicating with a base transceiver station.

8 Claims, 15 Drawing Sheets

US 7,444,152 B2

SIGNALING AND ROUTING PROTOCOLS FOR AN INTEGRATED CELLULAR AND RELAYING SYSTEM

FIELD OF THE INVENTION

This invention relates to utilizing relaying stations to complete calls in a cellular radio system.

BACKGROUND OF THE INVENTION

The cellular radio concept was introduced for wireless communications to address the scarcity of frequency spectrum The cellular radio concept is predicated on the subdividing of a geographical area into cells. Each cell is served by a base transceiver station (BTS). The frequency spectrum is reused in order to increase the call capacity of a wireless system. However, in order to avoid signal interference resulting from frequency reuse, cell boundaries prevent the frequency spectrum (corresponding to channels) that is assigned to a cell from being accessible to mobile hosts (wireless terminals) in cells in close proximity. Thus, a mobile host (MH) in a cell of a wireless system can use only a cellular bandwidth (CBW) of a BTS that is serving the cell.

When a call request occurs at a BTS that does not have sufficient CBW to support the call, the call request is rejected even though sufficient CBW is available at other BTS's (associated with other cells) of the wireless system. With spread spectrum wireless technology (such as code division multiple access (CDMA)), the frequency reuse factor is approximately 1, i.e., each BTS utilizes essentially the same frequency spectrum. However, each BTS is distinguished from other BTS's by digital encoding. Rather than being assigned a distinct portion of frequency spectrum, a mobile host is assigned a distinguishable digital channel. In such a case CBW is not associated with a distinct portion of frequency spectrum but with a digital channel. Not being able to access CBW of another BTS in other cells (which may not be utilizing all its CBW) limits the call capacity of a wireless system.

FIG. 1 shows an architecture of a wireless system 100 according to the prior art. Wireless system 100 comprises a packet switching center (PSC) 151, a BTS 107, a BTS 109, and a BTS 111. PSC 151 may be implemented as a base station controller (BSC) or a radio network controller (RNC). (A PSC may be referred as a "wireless controller.") PSC 151 maintains and provides current CBW for BTS 107, BSC 109, and BSC 111 for supporting calls for MH 113 and MH 115 through control lines 152, 154, and 156, respectively. PSC 151 instructs BTS 107, 109, and 111 to assign CBW to a call for MH 113 and 115 through control lines 152, 154, and 156.

In FIG. 1, MH 115 is currently being served by BTS 109 in a cell 103. At the instant of time, BTS 109 does not have spare CBW in order to serve other mobile hosts (wireless terminals). However, MH 113, which is in cell 103, requests that BTS 109 support a call by assigning CBW. The call may correspond to a call setup (originated by MH 115 or terminated at MH 115) or to a handoff in which MH 113 was previously served by another BTS in another cell (e.g. BTS 107 in cell 101) and has moved into cell 103. Even though BTS 107 or BTS 111 may have spare capacity (i.e., CBW), MH 113 is unable to benefit from resources of BTS's in corresponding cells in which MH 113 is not located. Thus, a call will fail in such a case.

SUMMARY OF THE INVENTION

The present invention provides signaling protocols that enable an integrated cellular relaying system to support a call for a wireless terminal. In embodiments of the invention, the wireless terminal is redirected to a relaying path corresponding to at least one relaying station. A relaying station communicates with the wireless terminal and with other relaying stations. In addition, one of the relaying stations (that is configured in the relaying path) completes the relaying path by communicating with a base transceiver station.

The first embodiment of the invention provides a signaling protocol for relaying a call through at least one ad hoc relaying station (ARS) that utilizes a packet switching center. The packet switching center maintains bandwidth information about ad hoc relaying stations and base transceiver stations and determines a relaying path according to a criterion such as a cost that is associated with the relaying path. The packet switching center instructs a plurality of base transceiver stations to initiate the establishment of the relaying path. Consequently, the plurality of base transceiver stations configure associated ad hoc relaying stations to configure the relaying path. The wireless terminal utilizes the relaying path to complete the call to one of the base transceiver stations.

The second embodiment of the invention provides a signaling protocol for relaying a call through at least one ad hoc relaying station in which a relaying path is determined by one of the ad hoc relaying stations. The ad hoc relaying stations maintain topological and bandwidth information about other ad hoc relaying stations and receive bandwidth information about base transceiver stations through messaging.

The third embodiment of the invention provides a signaling protocol for relaying a call through at least one ad hoc relaying station in which a plurality of relaying paths are established. The ad hoc relaying station need not maintain bandwidth information about other ad hoc relaying stations and base transceiver stations. One relaying path is selected to support the call in accordance with a criterion. The other relaying paths are torn down by the corresponding ad hoc relaying stations.

In other embodiments of the invention, computer-executable instructions or control logic for implementing the disclosed methods are stored on computer-readable media or implemented with hardware modules.

Other features and advantages of the invention will become apparent with reference to the following detailed description and the figures.

BRIEF DESCRIPTION OF THE DRAWINGS

A more complete understanding of the present invention and the advantages thereof may be acquired by referring to the following description in consideration of the accompanying drawings, in which like reference numbers indicate like features and wherein.

DETAILED DESCRIPTION OF THE INVENTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 2:
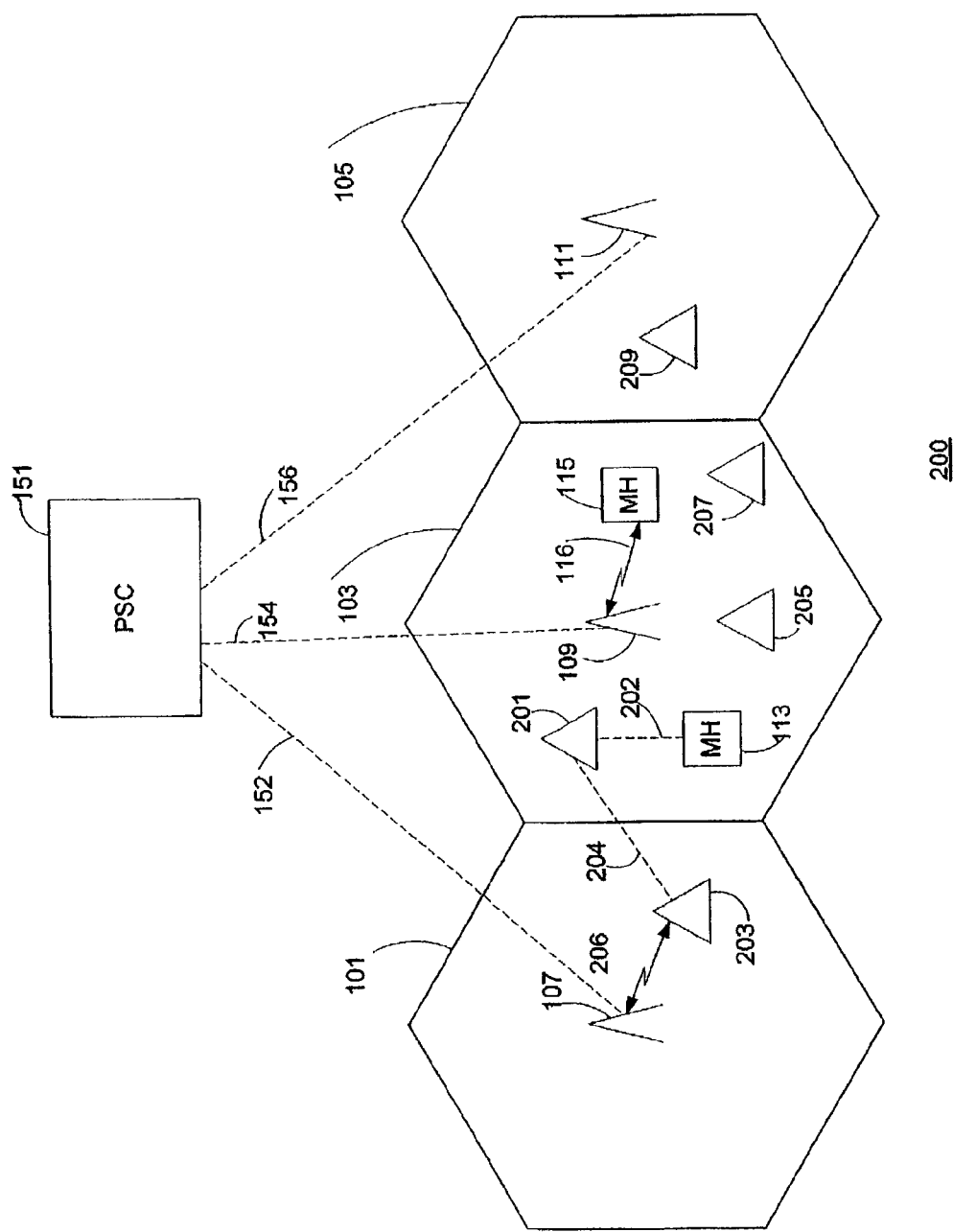
FIG. 2 shows an architecture of an integrated cellular and relaying (iCAR) system utilizing primary relaying, in accordance to an embodiment of the invention.

FIG. 2 shows an architecture of an integrated cellular and ad hoc relaying (iCAR) system 200 according to an embodiment of the invention. In order to increase the call capacity of wireless system 200, ad hoc relaying stations (ARS) 201, 203, 205, 207, and 209 are integrated with the operation of base transceiver stations (BTS) 107, 109, and 111 and PSC 151. A BTS comprises a receiver and a transmitter in order to communicate with a mobile host over a wireless channel. (The terms "mobile host" and "wireless terminal" are used interchangeably. A mobile host or a wireless terminal can provide voice, data, and multimedia services.) The BTS utilizes frequency spectrum that is allocated for cellular radio operation. Also, the term "ad hoc relaying station" clarifies that a relaying station can be placed geographically anywhere in the wireless system. MH 115 is served by BTS 109 utilizing cellular frequency spectrum and corresponding to a cellular bandwidth (CBW). With other embodiments of the present invention that utilize spread spectrum technology (e.g. code division multiple access (CDMA)), CBW corresponds to a digital channel. (The terms "channel" and "cellular bandwidth" are used interchangeably.)

Figure 1:
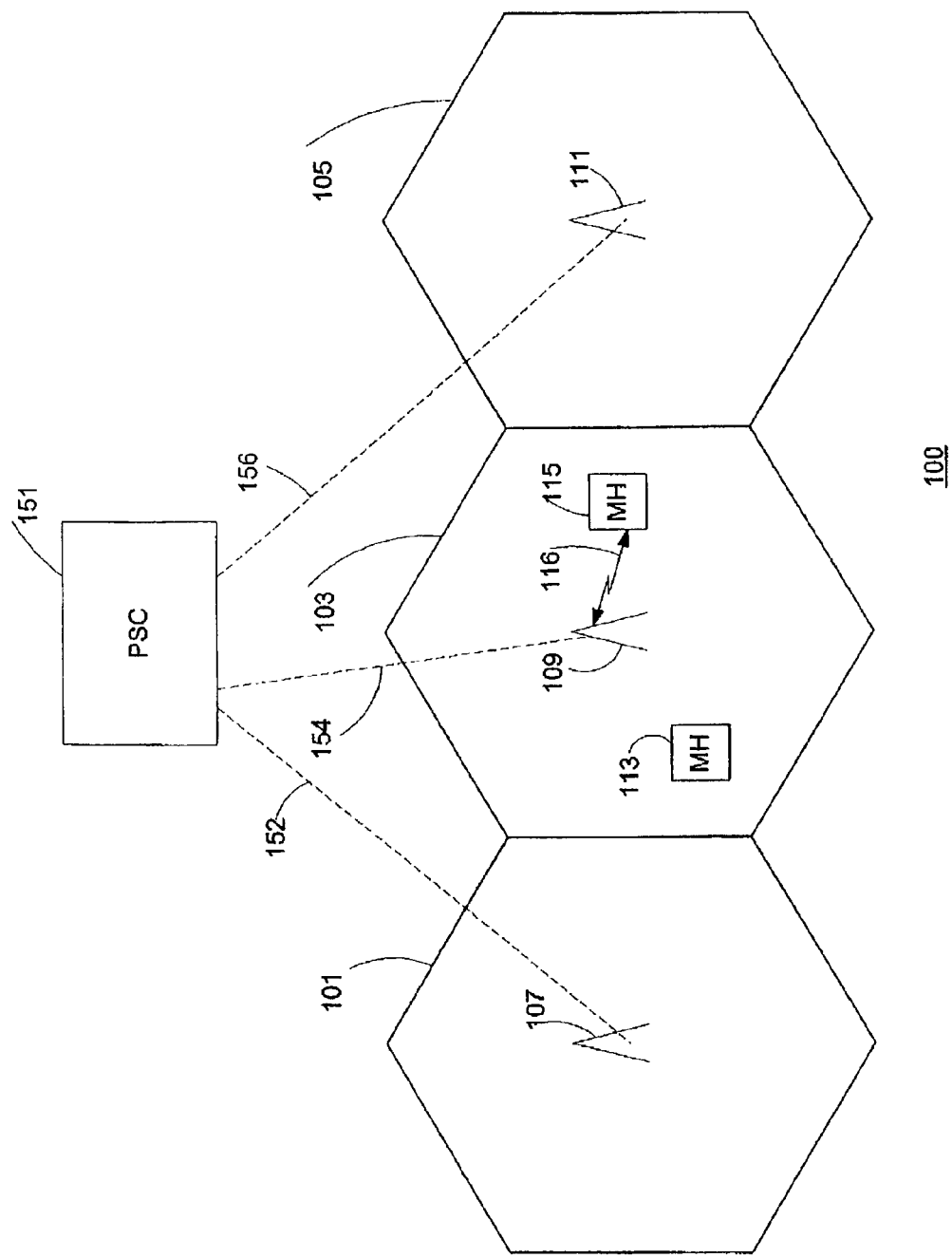
FIG. 1 shows an architecture of a wireless system according to the prior art.

As in FIG. 1, MH 113 cannot be served by BTS 109 because BTS 109 has used all of its assigned CBW. BTS 107 does have CBW that can be assigned to a call for MH 113; however, MH 113 cannot be directly served by BTS 107 because MH 113 is located in cell 103 rather than in cell 101, which is the serving area of BTS 107.

In order to support a communication path between MH 113 and BTS 107, iCAR system 200 configures ARS 201 and ARS 203 in a relaying path. ARS 201, 203, 205, 207, and 209 have two radio interfaces: a cellular interface (C-interface) for communicating with a BTS and a relaying-interface (R-interface) for communicating with a MH or another ARS. In the exemplary embodiments, the C-interface operates at approximately 1900 MHz, corresponding to the personal communications system (PCS) frequency spectrum, while the R-interface operates at approximately 2.4 GHz, corresponding to unlicensed Industrial Scientific Medical (ISM) frequency spectrum (However, alternative embodiments can utilize other frequency spectra, in which a first frequency spectrum is associated with the C-interface and a second frequency spectrum is associated with the R-interface.) In the exemplary embodiments, the transmission range of ARS 201, 203, 205, 207, and 209 is typically shorter over the R-interface than over the C-interface. Also, the transmission capability of the ARS's is typically larger than the transmission capability of the MH's.

ARS 201, 203, 205, 207, and 211 can support the following functionality, depending upon the configuration of a call:

Proxy ARS: supports a point of contact with an MH (e.g. ARS 201 in FIG. 2)

Gateway ARS: supports a point of contact with the BTS that serves the call (e.g. ARS 203 in FIG. 2). A gateway ARS utilizes both the R-interface and the C-interface in supporting a call.

Intermediate ARS: supports a point of contact between the proxy ARS and the gateway ARS.

Also, in the exemplary embodiments, a BTS instructs an ARS on the C-interface in order to configure the ARS for a call as will be discussed with the signaling protocol scenarios shown in FIGS. 4, 9, 10, 12, 13, and 15.

In the exemplary embodiments, MH 113 and MH 115 support both the R-interface and the C-interface. The R-interface is utilized by the mobile host to communicate through an ARS to a BTS. The mobile host transmits signaling messages to an ARS (as shown in FIGS. 4, 9, 10, 12, 13, and 15) using the R-interface. Also, the mobile host utilizes the R-interface to transport user information (e.g. voice or data) to an ARS when a relaying path has been established. The C-interface is utilized by the mobile host when the mobile host communicates directly with a BTS. The mobile host also utilizes the C-interface when sending signaling messages or user data (e.g. voice or data) directly to a BTS. Also, the ARS utilizes the C-interface when sending signaling messages or sending user information (that the ARS is relaying) to a BTS.

In FIG. 2, MH 113 is served by BTS 107 through the relaying path: R-link 202, ARS 201, R-link 204, ARS 203, and C-link 206. Each R-link utilizes ISM frequency spectrum with an associated relaying bandwidth (RBW). Each C-link utilizes cellular frequency spectrum with an associated CBW. ARS 201 serves as a proxy ARS and ARS 203 serves as a gateway ARS.

Figure 3:
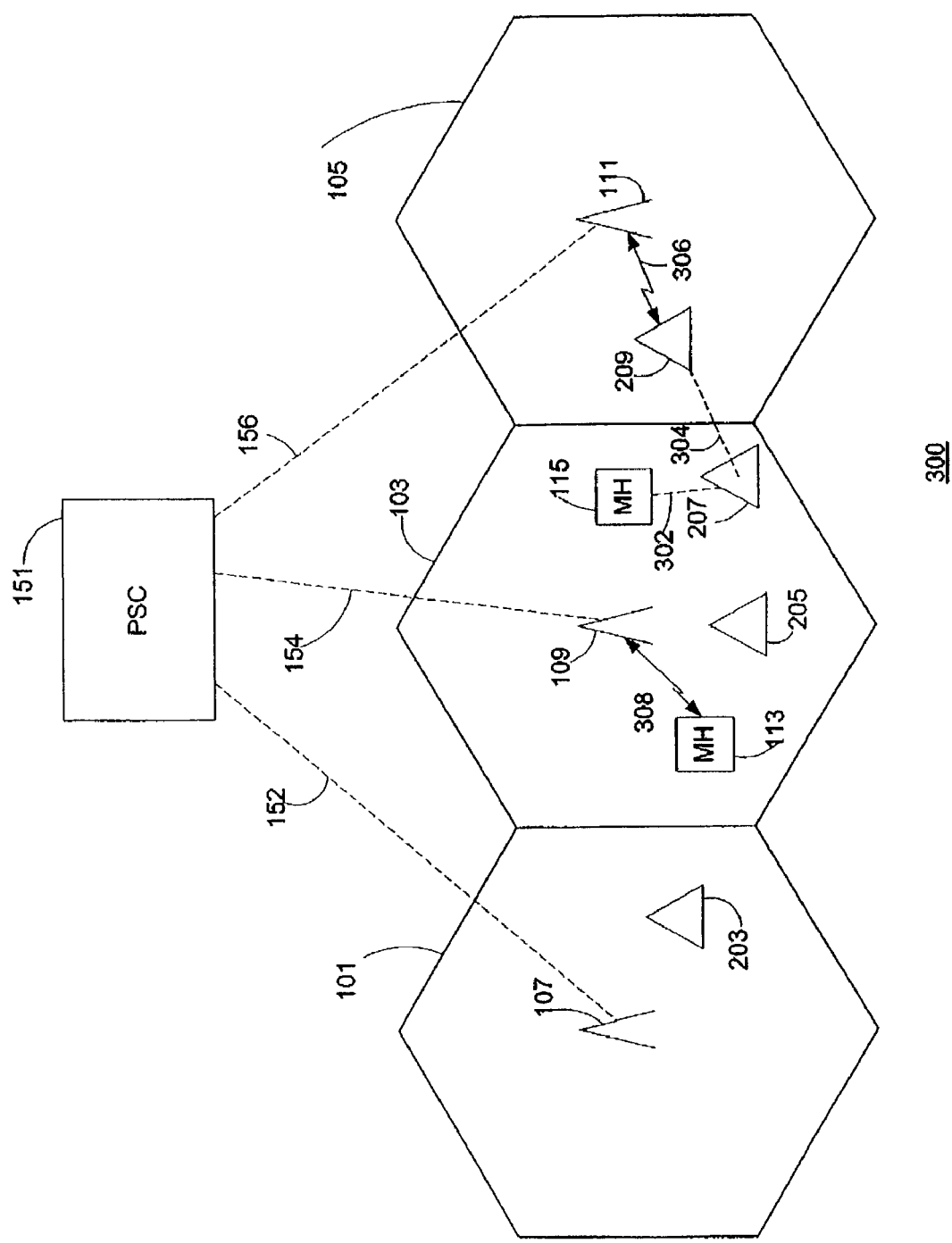
FIG. 3 shows an architecture of an integrated cellular and relaying (iCAR) system utilizing secondary relaying, in accordance to an embodiment of the invention.

FIG. 3 shows an architecture of an iCAR system 300 utilizing secondary relaying. In FIG. 3, BTS 109 has insufficient CBW to serve MH 113. However, unlike with FIG. 2, MH 113 is not in close proximity to connect to ARS 201. (In FIG. 3, ARS 201 is not configured as in iCAR 200.) In such a case, another mobile host that is currently being served by BTS 109 is redirected to a secondary relaying path through at least one ARS to a BTS that serves a cell in which the mobile host is not located. MH 115 is instructed to connect to BTS 111, termed a foreign BTS (F_BTS), through R-link 302, ARS 207, R-link 304, ARS 209, and C-link 306. The vacated CBW at BTS 109, termed the home BTS (H_BTS), that was previously assigned to MH 115 is reassigned to MH 113.

In the embodiment, call processing utilizing secondary relaying is executed if primary relaying is unsuccessful. (However, other embodiments of the invention may utilize secondary relaying without previously attempting primary relaying.) Both primary relaying and secondary relaying are applicable to different wireless technologies, including analog technologies, time division multiple access technologies, and code division multiple access technologies. Moreover, both primary relaying and secondary relaying support calls corresponding to voice services, data services, and multimedia services.

Both primary and secondary relaying can be utilized during setting up a call (either a mobile host originating a call or a call terminating to a mobile host) and during handing off a mobile host as the mobile host moves into a serving region of another BTS. In some embodiments of the invention, a mobile host is notified by a base transceiver station to initiate either primary or secondary relaying when the mobile host is being called (i.e. a call terminating to the mobile host) or when the mobile host is being handed off during a call. Moreover the call capacity of iCAR system 200 and iCAR system 300 can be increased by balancing (distributing) calls to BTS's that have CBW when other BTS's do not have sufficient CBW to serve mobile hosts within corresponding cells. In accordance with the signaling protocols disclosed herein, other embodiments of the invention can utilize primary and secondary relaying in order to ameliorate a shortage of BTS resources (e.g. processing capacity) other than the assigned frequency spectrum.

In the signaling protocol scenarios shown in FIGS. 4, 9, 10, 12, 13, and 15 signaling messages utilize the C-interface to a BTS on a control channel even though the BTS does not have sufficient CBW to support user traffic (e.g. voice and user data). In wireless systems, signaling messages typically can be sent over the control channel even though dedicated channels that transport user traffic are congested.

Figure 4:
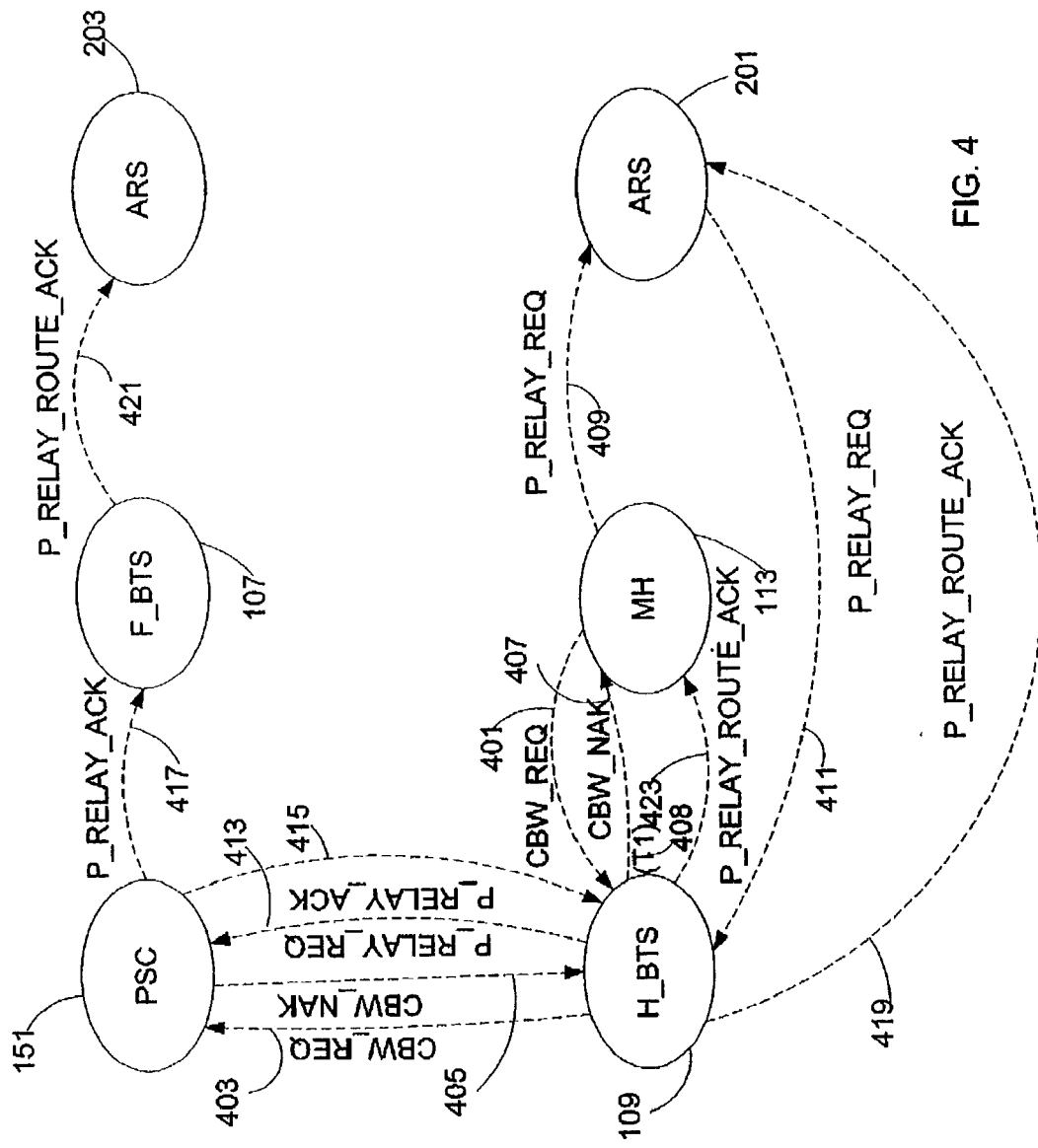
FIG. 4 shows a packet switching center (PSC)-assisted signal protocol scenario utilizing primary relaying according to an embodiment of the invention.

FIG. 4 shows a packet switching center (PSC)-assisted signal protocol scenario utilizing primary relaying according to a first embodiment of the invention. The signal protocol scenario of FIG. 4 corresponds to the architecture that is shown in FIG. 2. MH 113 requests for a call by sending CBW_REQ 401 to BTS 109. (BTS 109 serves as a home BTS (H_BTS) for the call). BTS 109 queries PSC 151 for spectrum assignment by sending CBW_REQ 403. In this protocol scenario, PSC 151 determines that BTS 109 does not have adequate CBW to assign to MH 113, so PSC 151 returns CBW_NAK 405 to BTS 109. BTS 109 sends CBW_NAK 407 to MH 113, indicating that a call cannot be supported because of insufficient CBW.

BTS 109 starts timer T1 408 after sending CBW_NAK 407. If timer 408 has not expired, BTS 109 processes a response from an ARS (e.g. ARS 201 returning P_RELAY_REQ 411). The value of timer 408 is typically limited by the maximum delay budget that is allowed for primary relaying. (In subsequent discussions of signaling protocol scenarios in FIGS. 9, 10, 12, 13, and 15, the consideration of timers is not shown. However, one skilled in the art appreciates that the inclusion of timers may resolve any abnormalities that may occur with processing a call.)

Upon receiving CBW_NAK 407, MH 113 queries whether any ARS's (e.g. ARS 201) can support the call by broadcasting P_RELAY_REQ 409 over the R-interface with a sequence number that is associated with MH 113. (FIG. 2 only shows one ARS in close proximity to the location of MH 113; however the present invention supports a plurality of ARS's.) ARS 201 processes message 409 and sends P_RELAY_REQ to BTS 109 over the C-link with the sequence number. The responses (e.g. response 411) are forwarded by BTS 109 to PSC 151 using P_RELAY_REQ 413. The sequence number is included in message 413 so that MH 113 can be subsequently identified. In the embodiment, BTS 109 starts a timer after sending CBW_NAK 407. BTS 109 processes a P_RELAY_REQ message (e.g. message 411) from an ARS if the message is received before the timer expires.

PSC 151 utilizes information about the system topology and bandwidth (both RBW and CBW) to determine the shortest relaying path from one of the responding ARS's to a non-congested BTS. In the embodiment, PSC 151 maintains bandwidth information about each BTS and ARS within the serving region of the PSC (i.e., cells 101, 103, and 105). PSC 151 determines the shortest relaying path by determining the minimum distance for all possible paths. In the embodiment, PSC 151 determines the path with the least number of hops, in which a hop is between adjacent nodes (either an ARS or BTS) of the path However, other embodiments may utilize other criteria, including determining a relaying path with the greatest available bandwidth. For example, with such an embodiment the available RBW of each ARS along a possible path is determined. A corresponding reciprocal (1/RBW) is calculated and the sum of the reciprocals corresponding to the possible path is determined. The path that is associated with the smallest sum with respect to other possible paths is deemed as having the greatest available bandwidth.

If PSC 151 determines that a relaying path is available, PSC 151 will send P_RELAY_ACK 415 to BTS 109 and P_RELAY_ACK 417 to BTS 107 (which functions as a foreign BTS in this call scenario). P_RELAY_ACK 415 and 417 contains the complete routing information of the relaying path (i.e., the identification of all ARS's and the destination BTS associated with the path as well as the sequence number). BTS 107 reserves CBW that is needed for the connection with ARS 203 (which functions as a gateway ARS). BTS 109 and BTS 107 consequently multicast P_RELAY_ROUTE_ACK 419 and 421 to all ARS's that are associated with the relaying path (e.g. ARS 201 and ARS 203) to initiate relaying for the call. ARS 201 and 203 consequently reserve RBW for the call. MH 113 is instructed to initiate the call when BTS 109 (which functions as the home BTS in the call) sends P_RELAY_ROUTE_ACK 423 to MH 113.

Figure 5:
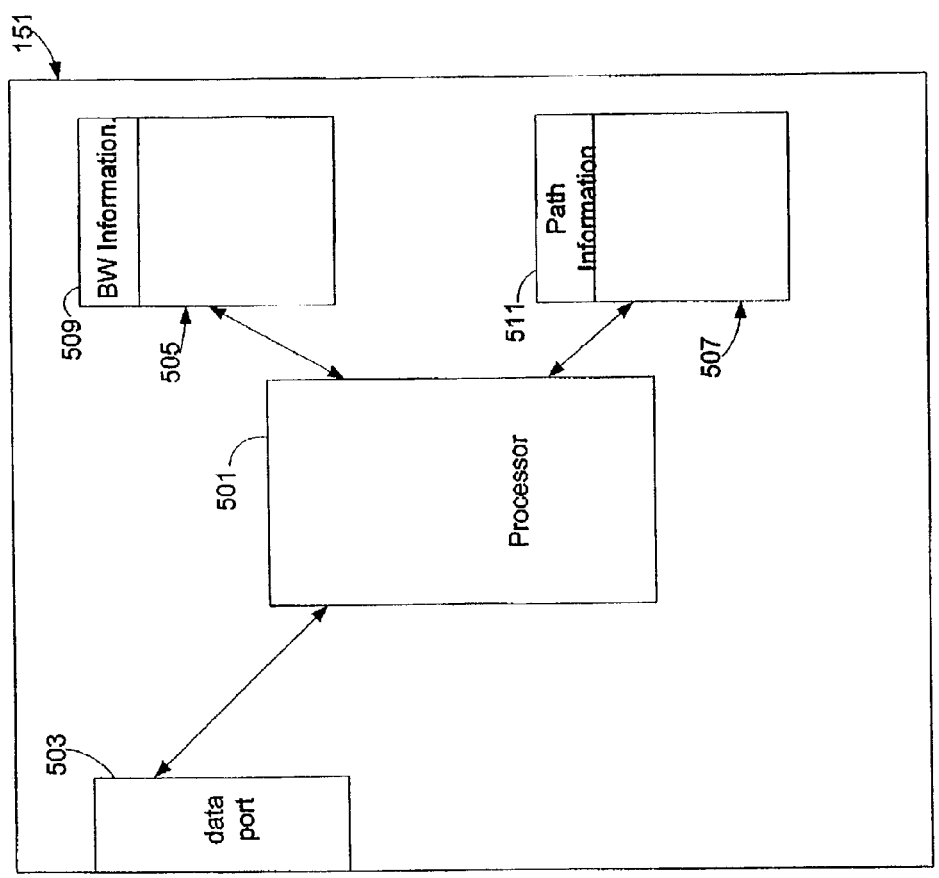
FIG. 5 shows apparatus of a packet switching center (PSC) according to an embodiment of the invention.

FIG. 5 shows apparatus of PSC 151 according to an embodiment of the invention. PSC 151 communicates with to BTS 107, 109, and 111 through data port 503 over control lines 152, 154, and 156 (as shown in FIG. 2). Messages to and from BTS 107, 109, and 111 are processed by processor 501. In order to determine the shortest relaying path in response to receiving P_RELAY_REQ 413, processor 501 accesses data structure 505 to obtain bandwidth information 509 (both the CBW's of BTS's and the RBW's of ARS's) and accesses data structure 507 to obtain topological information 511 (which reflects the connectivity among ARS's and BTS's) for feasible relaying paths between the proxy ARS and the destination BTS. In the embodiment, topological information 511 is updated by the service provider inputting topological information through data port 503 and processor 501.

Figure 6:
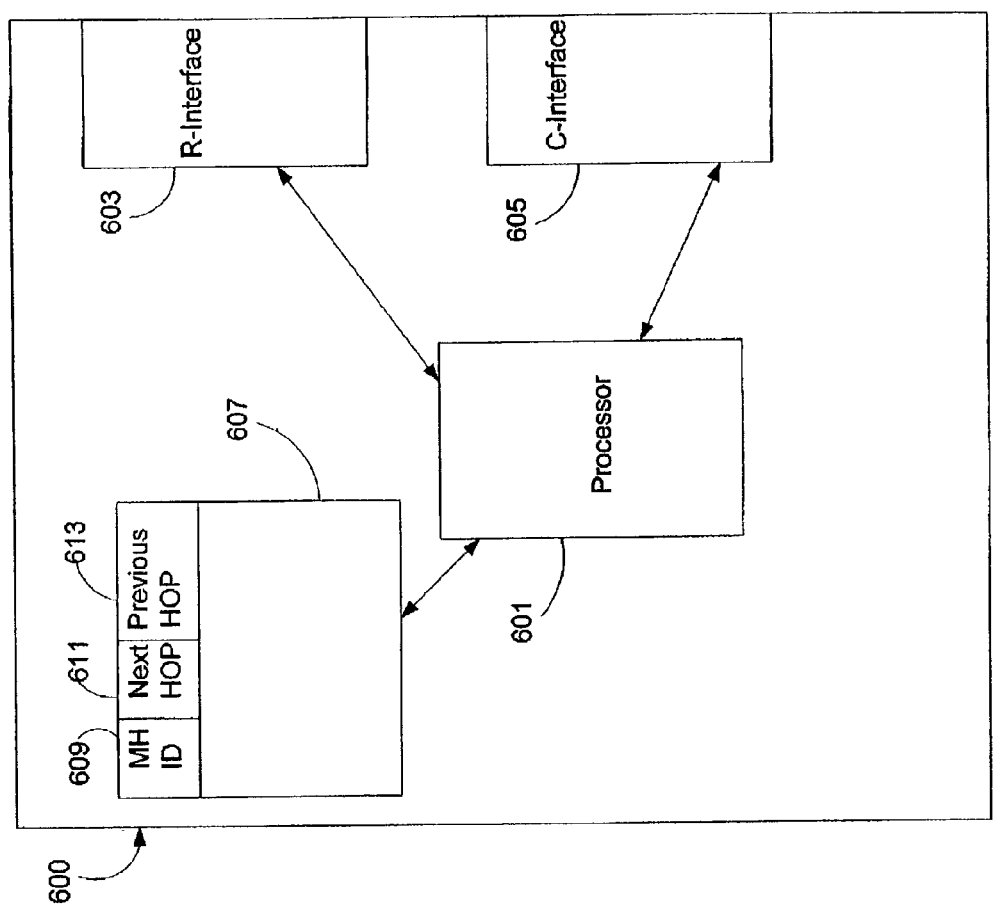
FIG. 6 shows apparatus for an ad hoc relaying station (ARS) according to an embodiment of the invention.

FIG. 6 shows apparatus for ad hoc relaying station (ARS) 600 according to an embodiment of the invention. The apparatus shown for ARS 600 is the same as for ARS 201, 203, 205, 207, and 209 in the embodiment. ARS 600 utilizes R-interface 603 when communicating with an MH or another ARS and utilizes C-interface 605 when communicating with a BTS. Processor 601 processes messages from R-interface 603 and C-interface 605 as described in the signaling protocol scenarios of FIGS. 4, 9, 10, 12, 13, and 15. Data structure 607 functions as a switching table. Each entry corresponds to a call that is supported by ARS 600. Entry MH_ID 609 corresponds to the identification of the MH (e.g. telephone number or IP address), entry 611 is the identification of the next node in the relaying path (either an ARS or BTS), and entry 613 is the previous node in the path (either the MH or an ARS).

Figure 7:
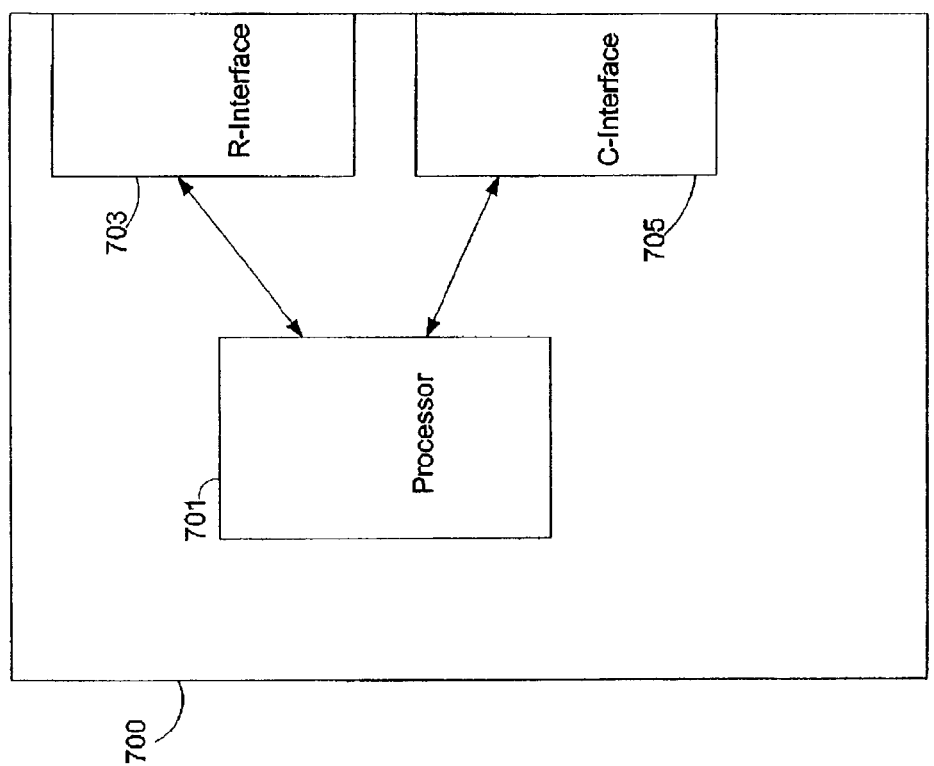
FIG. 7 shows apparatus for a mobile host (MH) according to an embodiment of the invention.

FIG. 7 shows apparatus for mobile host (MH) 700 according to an embodiment of the invention. The apparatus shown for MH 700 is the same as for MH 113 and for MH 115. MH 700 supports both R-interface 703 (when communicating with an ARS) and C-interface 705 (when communicating with a BTS). Processor 701 processes messages from R-interface 703 and C-interface 705 in accordance with the signaling protocol scenarios shown in FIGS. 4, 9, 10, 12, 13, and 15.

Figure 8:
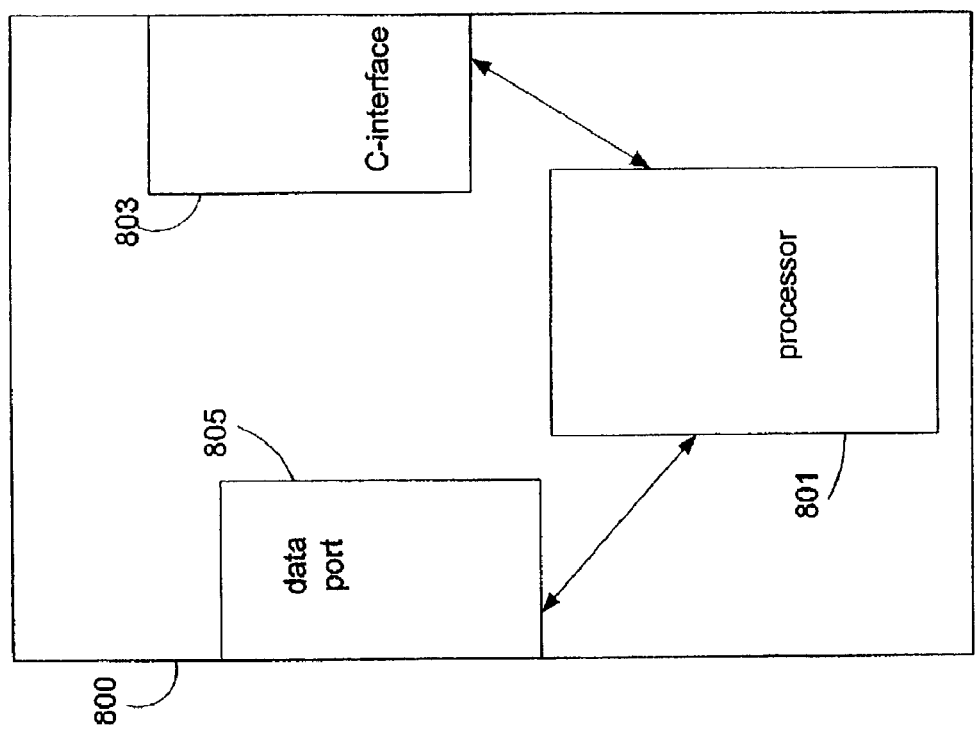
FIG. 8 shows apparatus of a base transceiver station (BTS) according to an embodiment of the invention.

FIG. 8 shows apparatus of base transceiver station (BTS) 800 according to an embodiment of the invention. The apparatus shown for BTS 800 is the same as for BTS 101, 103, and 105 in the exemplary embodiments. BTS 800 communicates with PSC 151 through data port 805. BTS 800 communicates with MH 113 and MH 115 through C-interface 803. Processor 801 processes messages from data port 805 and C-interface 803 in accordance with the signaling protocol scenarios shown in FIGS. 4, 9, 10, 12, 13, and 15.

Figure 9:
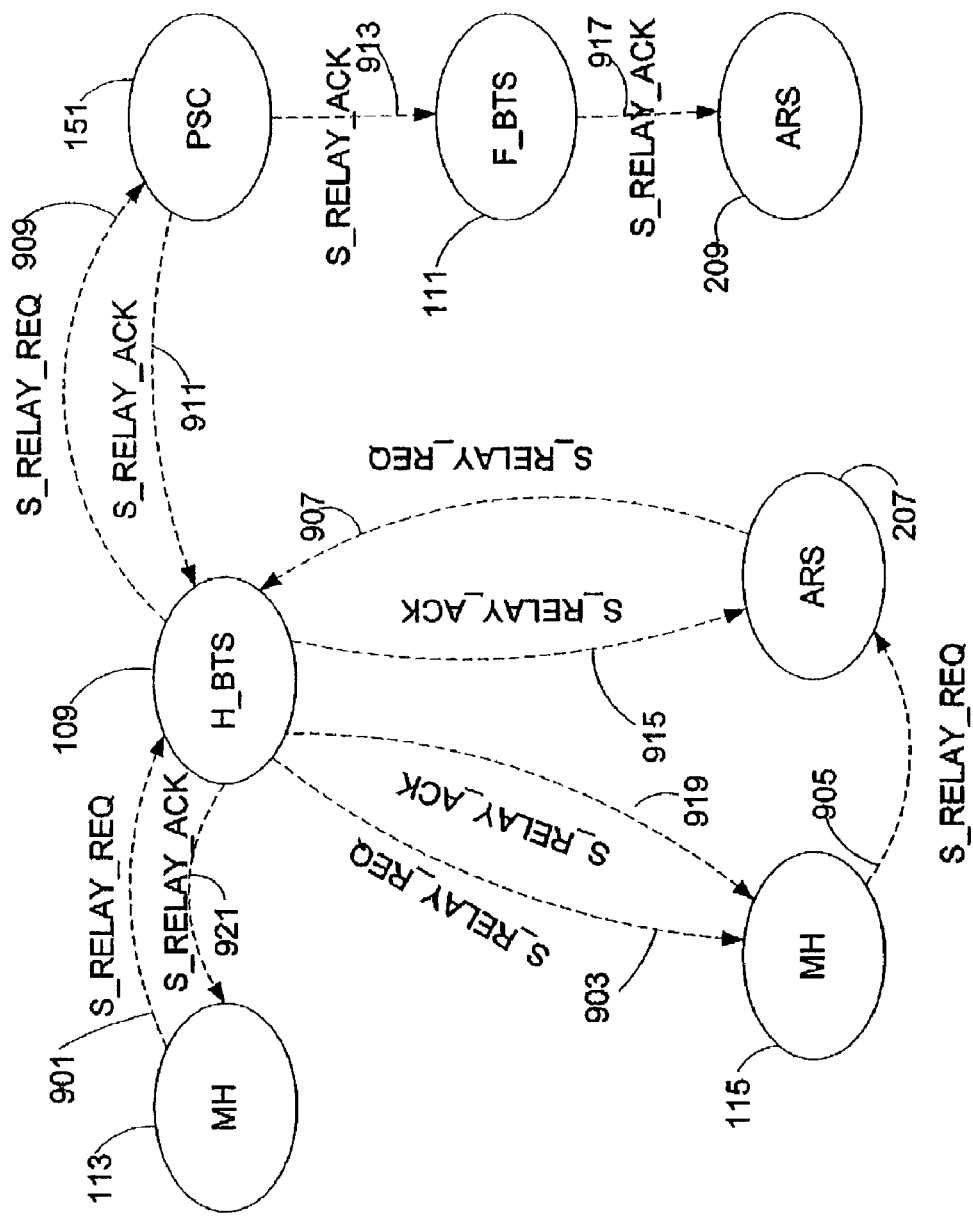
FIG. 9 shows a PSC-assisted signaling protocol scenario utilizing secondary relaying according to an embodiment of the invention.

FIG. 9 shows a PSC-assisted signaling protocol scenario utilizing secondary relaying according to a variation of the first embodiment. The signal protocol scenario of FIG. 9 corresponds to the architecture that is shown in FIG. 3. In the embodiment, secondary relaying is attempted if primary relaying is successful. One reason for primary relay being unsuccessful is that MH113 is not in close proximity to an ARS. Secondary relaying is then invoked so that an MH that is currently assigned CBW by the home BTS (BTS 109) is redirected to an ARS in close proximity (proxy ARS) and a relaying path is established to a foreign BTS. In other embodiments of the invention, secondary relaying may be attempted without attempting primary relaying.

In FIG. 9, MH 113 initiates secondary relaying by sending S_RELAY_REQ 901, which contains a sequence number in order to identify MH 113, to BTS 109. BTS 109 multicasts the message by sending S_RELAY_REQ 903 to all mobile hosts (e.g. MH 115) that have been assigned CBW by BTS 109. In a variation of the embodiment, BTS 109 multicasts message 903 only to mobile hosts in a group that are associated with a level of quality of service (QoS). This variation enables mobile hosts to be grouped by a QoS level, in which only mobile hosts in the group are solicited for secondary relaying. (In a wireless system, there is a probability that the a redirected mobile host may encounter a degradation of service.) With the variation, mobile hosts in another group that are associated with a different level of QoS are not solicited for secondary relaying. With another variation of the invention, S_RELAY_REQ 903 may be sent to mobile hosts with the R-interface if the mobile hosts are not equipped with both the C-interface and the R-interface.

When MH 115 (currently assigned CBW) receives message 903, MH 115 multicasts S_RELAY_REQ 905 to all neighboring ARS's (e.g. ARS 207). ARS 207 processes the first S_RELAY_REQ 905 containing the sequence number (corresponding to MH 113), ARS 207 sends S_RELAY_REQ 907 to BTS 109. A plurality of ARS's can respond with message 907 having the same sequence number. Consequently, BTS 109 forwards S_RELAY_REQ 909 containing the responses from ARS 207 and all other responding ARS's. PSC 151 determines the shortest path from MH 115 to BTS 111 (which is considered the F_BTS), as with the scenario in FIG. 4. The shortest path (MH 115 to ARS 207 to ARS 209 to BTS 111 as shown in FIG. 3) is associated with one of the mobile hosts (e.g. MH 115) that is assigned CBW by BTS 109. In FIG. 9, the shortest path corresponds to MH 115. PSC 151 sends S_RELAY_ACK 911 to BTS 109 and S_RELAY_ACK 913 to BTS 111 with the routing information for the shortest path (between MH 115 and BTS 111) and an identification of MH 115. BTS 109 and BTS 111 consequently multicasts S_RELAY_ACK 915 to ARS 207 and S_RELAY_ACK 917 to ARS 209 in order to reserve bandwidth for the relaying path. MH 115 is instructed to connect to the relaying path by BTS 109 sending S_RELAY_ACK 919 to MH 115. MH 115 relinquishes its C-link, and MH 113 is assigned CBW when MH 113 receives S_RELAY_ACK 921.

Figure 10:
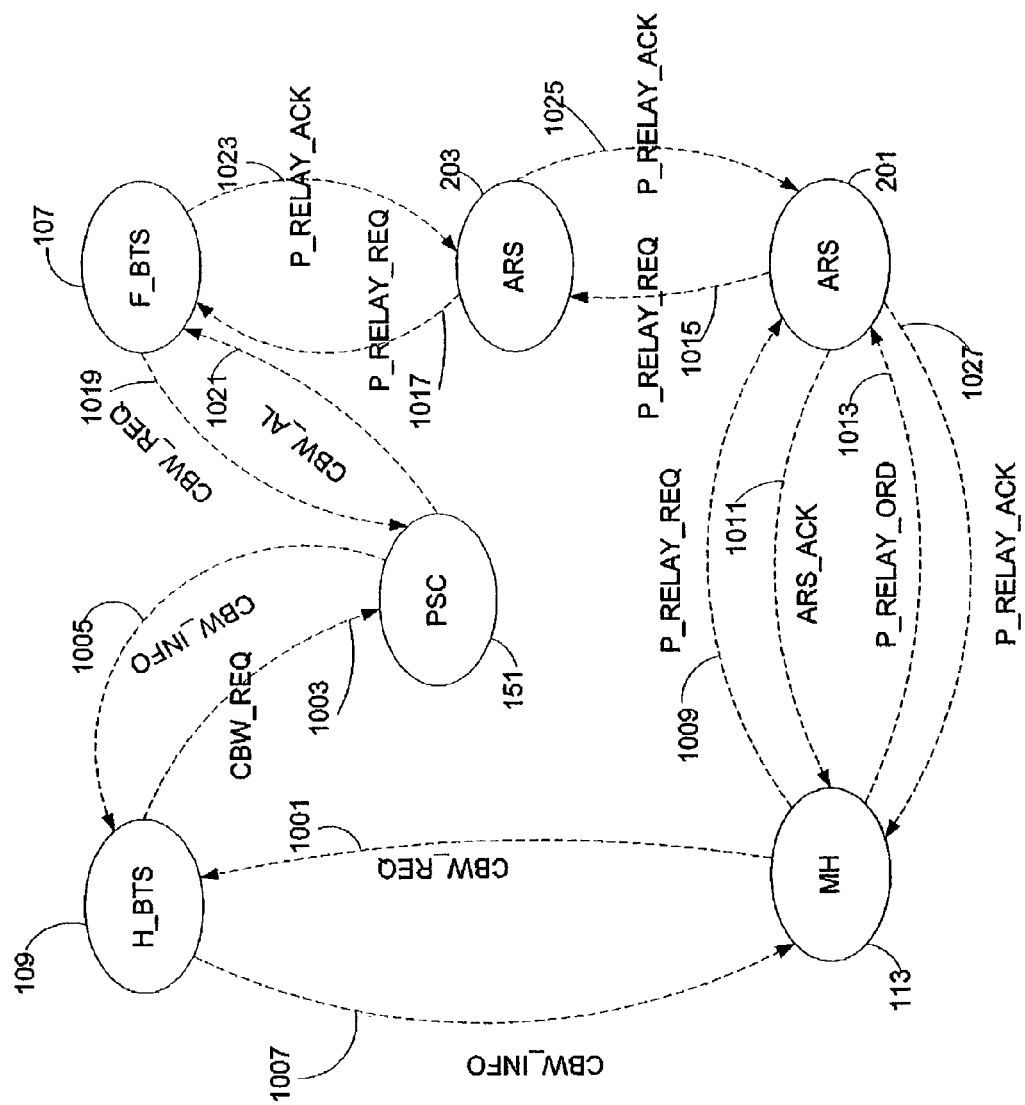
FIG. 10 shows a link-state based distributed signaling protocol scenario utilizing primary relaying according to an embodiment of the invention.

FIG. 10 shows a link-state based distributed signaling protocol scenario utilizing primary relaying according to a second embodiment of the invention. The signaling protocol scenario of FIG. 10 corresponds to the architecture that is shown in FIG. 2. With the link-state based distributed signaling protocol, each ARS maintains information about the iCAR's topology and maintains bandwidth information about other ARS's. (In the embodiment, an ARS exchanges bandwidth information by broadcasting bandwidth information about itself and its neighboring ARS's over the R interface.) With PSC-based signaling (FIGS. 4 and 9), PSC 151 maintains this information.

MH 113 requests for a call by sending CBW_REQ 1001 to BTS 109. BTS 109 consequently queries PSC 151 whether sufficient CBW is available at BTS 109 by sending CBW_REQ 1003 to PSC 151. (In the embodiment, BTS 109 does not maintain bandwidth information in order to reduce the complexity of BTS 109. However, with an alternative embodiment BTS 109 may maintain bandwidth information.) In the example, there is not sufficient CBW, and PSC 151 returns CBW_INFO 1005 to BTS 109. Message 1005 contains a list of candidate destination BTS's with the associated available CBW. BTS 109 forwards this information by sending CBW_INFO 1007 to MH 113. When MH 113 receives message 1007 (signifying that MH needs to initiate primary relaying), MH 113 multicasts R_RELAY_REQ 1009 to neighboring ARS's (e.g. ARS 201). Each ARS that receives message 1009 determines a minimum cost (e.g. number of hops or available bandwidth) and responds with ARS_ACK 1011 with the minimum cost. MH 113 sends P_RELAY_ORD 1013 to the ARS responding with the lowest cost function (e.g. ARS 201). Upon receiving message 1013, ARS 201 initiates the connection on a hop-hop basis to the destination BTS (e.g. 107) by sending ARS 203 P_RELAY_REQ 1015. Message 1015 contains an indication that a relaying path should be established and may contain the routing information for the relaying path. ARS 203 sends P_RELAY_REQ 1017 to the next node, which is BTS 107 in the example. BTS 107 determines whether sufficient CBW is available by sending CBW_REQ 1019 to PSC 151 and receiving CBW_AL 1021 from PSC 151. (BTS 107 queries PSC 151 about available CBW because information about the available CBW that is contained message 1005 may not be current.) Consequently, BTS 107 responds with P_RELAY_ACK 1023, causing ARS 203 to respond with P_RELAY_ACK 1025 to ARS 201. ARS 201 sends P_RELAY_ACK 1027 to MH 113 to indicate that the relaying path has been established.

Figure 11:
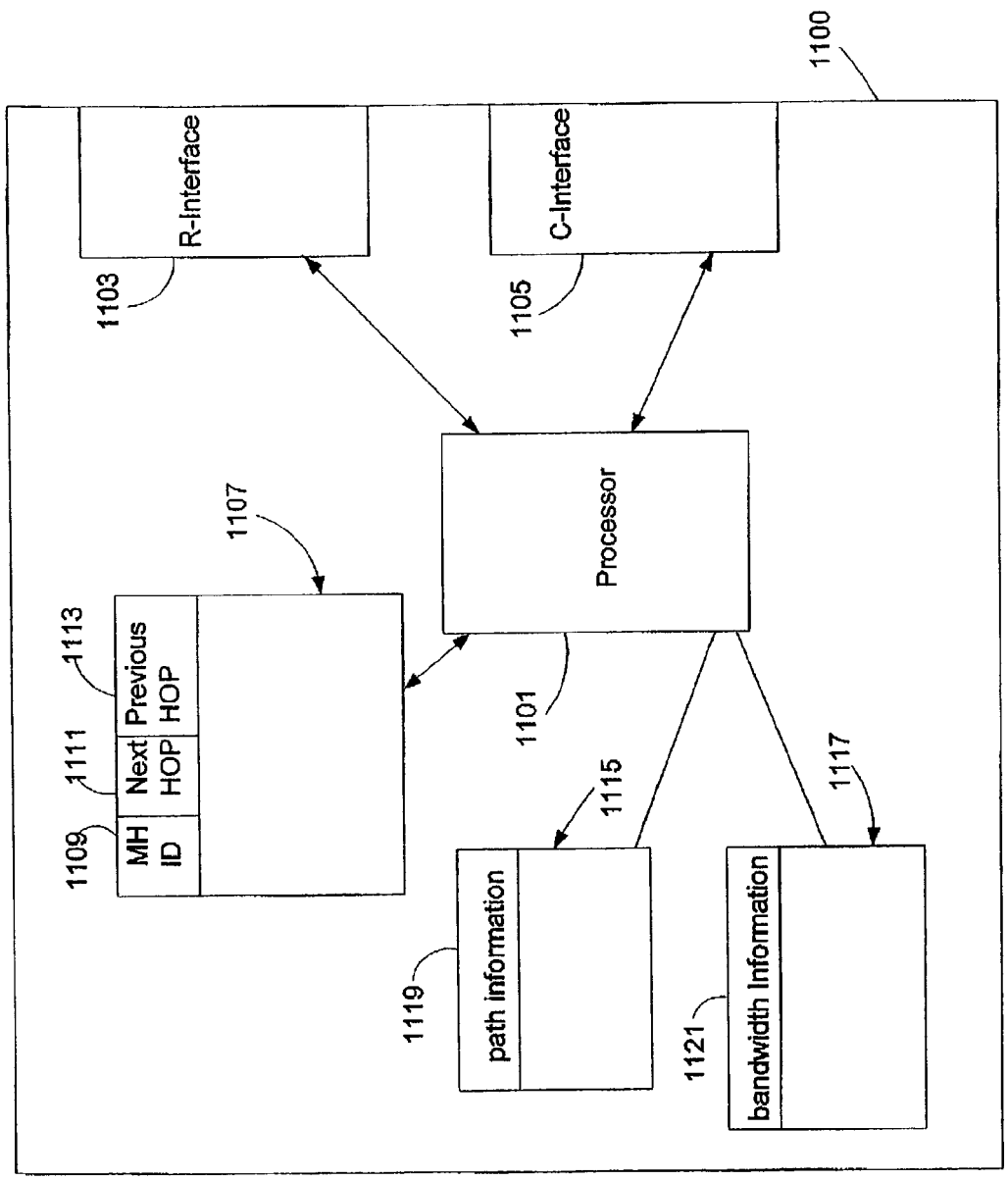
FIG. 11 shows apparatus of an ad hoc relaying station (ARS) that supports the protocol scenarios in FIGS. 10 and 12.
Figure 12:
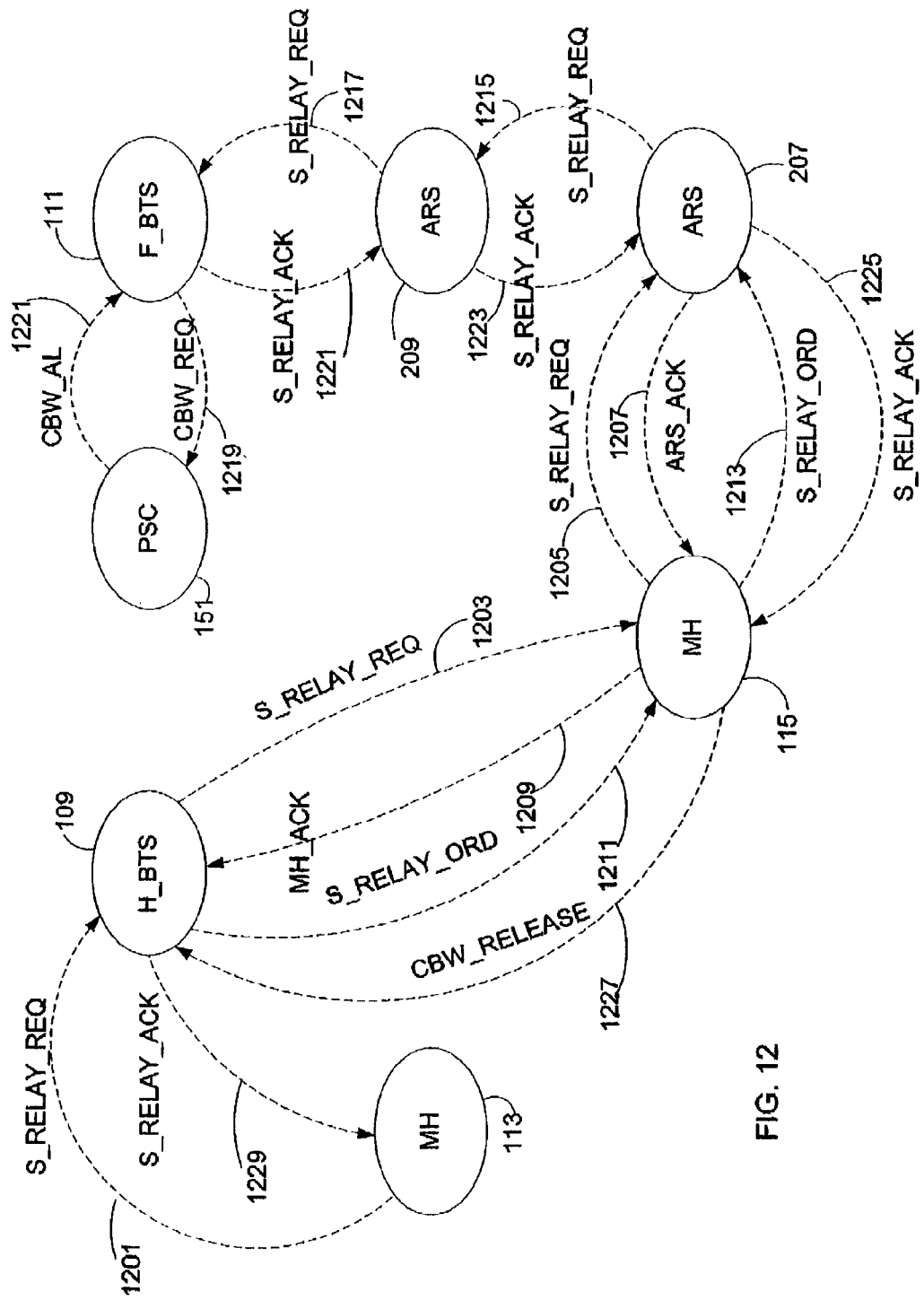
FIG. 12 shows a link-state based distributed signaling protocol scenario utilizing secondary relaying according to an embodiment of the invention.

FIG. 11 shows apparatus of an ad hoc relaying station (ARS) 1100 that supports the protocol scenarios shown in FIGS. 10 and 12. Processor 1101, data structure 1107, R-interface 1103, and C-interface 1105 correspond to data structure 607, R-interface 603, and C-interface 605 in FIG. 6. ARS 1100 contains data structures 1119 and 1121 in order that ARS 1100 can determine the shortest relaying path when ARS 1100 receives P_REQ_REQ (e.g. message 1009) with a link-based distributed signaling protocol.

FIG. 12 shows a link-state based distributed signaling protocol scenario utilizing secondary relaying according to a variation of the second embodiment of the invention. The signaling protocol scenario of FIG. 12 corresponds to the architecture that is shown in FIG. 3. In the embodiment, MH 113 sends S_RELAY_REQ 1201 to BTS 109. BTS 109 multicasts S_RELAY_REQ 1203 to mobile hosts that are currently assigned CBW (i.e., active mobile hosts). Message 1203 also contains information about candidate BTS's that have available CBW. In the embodiment, BTS 109 stored the CBW information that was contained in message 1203 when MH 113 attempted primary relaying. However, alternative embodiments can query PSC 115 for CBW information as in FIG. 10. Consequently, active mobile hosts (e.g. MH 113) multicasts S_RELAY_REQ 1205 to neighboring ARS's (e.g. ARS 207). Responding ARS's (e.g. ARS 207) return ARS_ACK with the best path information to the candidate BTS's. MH 115 returns this information to BTS 109 with the best path information BTS 109 determines the best path spanning the active mobile hosts. In the embodiment, BTS 109 chooses the path corresponding to a smallest number of hops. In FIG. 12, the best path corresponds to MH 115; thus, BTS 109 sends S_RELAY_ORD 1211 to MH 115. MH 115 initiates the establishment of the relaying path by sending S_RELAY_ORD 1213 to ARS 207. BTS 109 sends a message to each of the remaining active mobile hosts in order to cancel any further action. The establishment of the relaying path is similar as with FIG. 10 corresponding with messages 1215, 1217, 1219, 1221, and 1223. With the establishment of the relaying path, ARS 207 returns S_RELAY_ACK 1225 to MH 115 to redirect the call through the relaying path. The CBW is reassigned to MH 113 by MH 115 sending CBW_RELEASE 1227 to BTS 109, and S_RELAY_ACK 1229 is consequently sent to MH 113.

Figure 13:
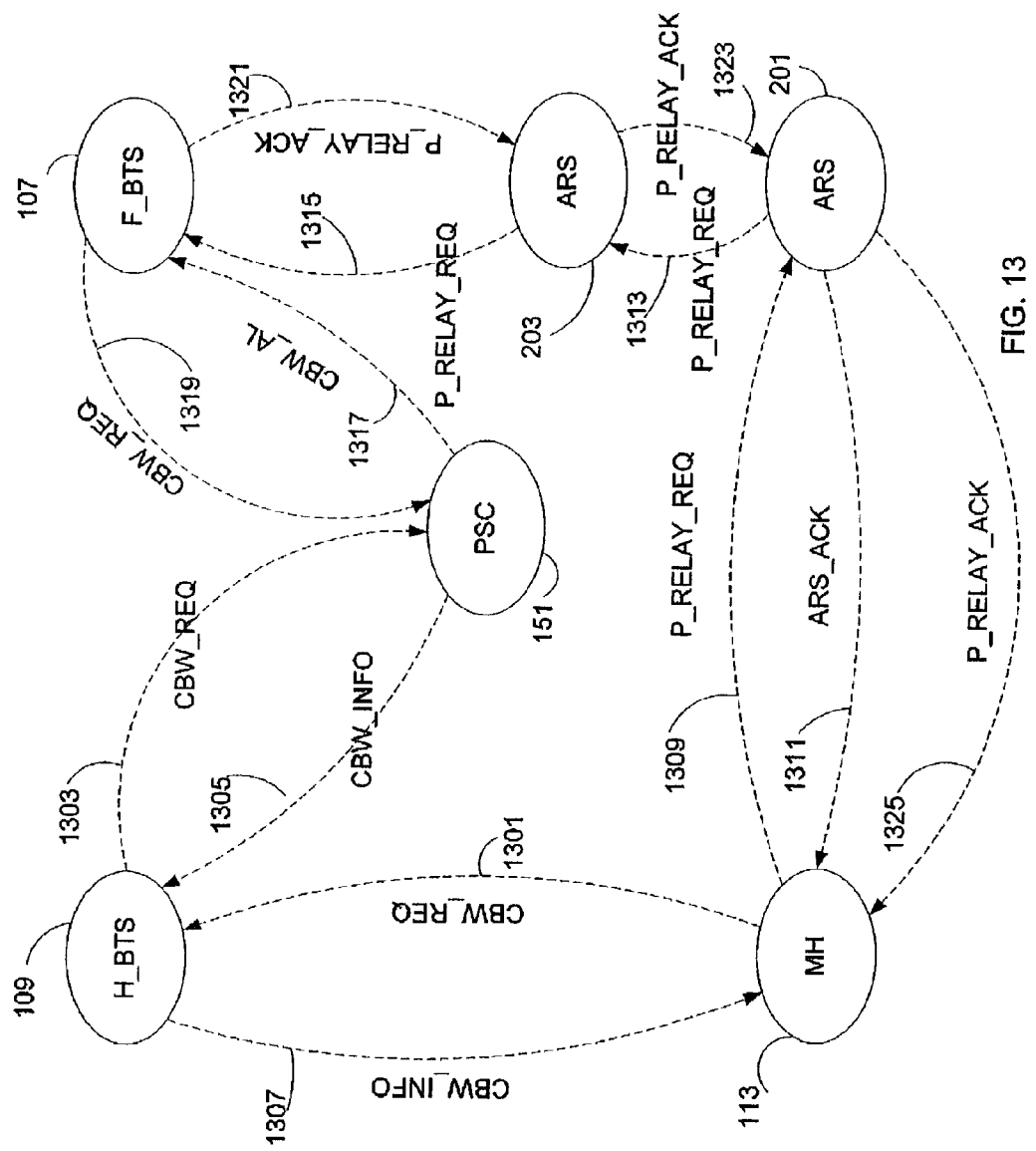
FIG. 13 shows a distributed signaling protocol scenario utilizing primary relaying according to an embodiment of the invention.
Figure 15:
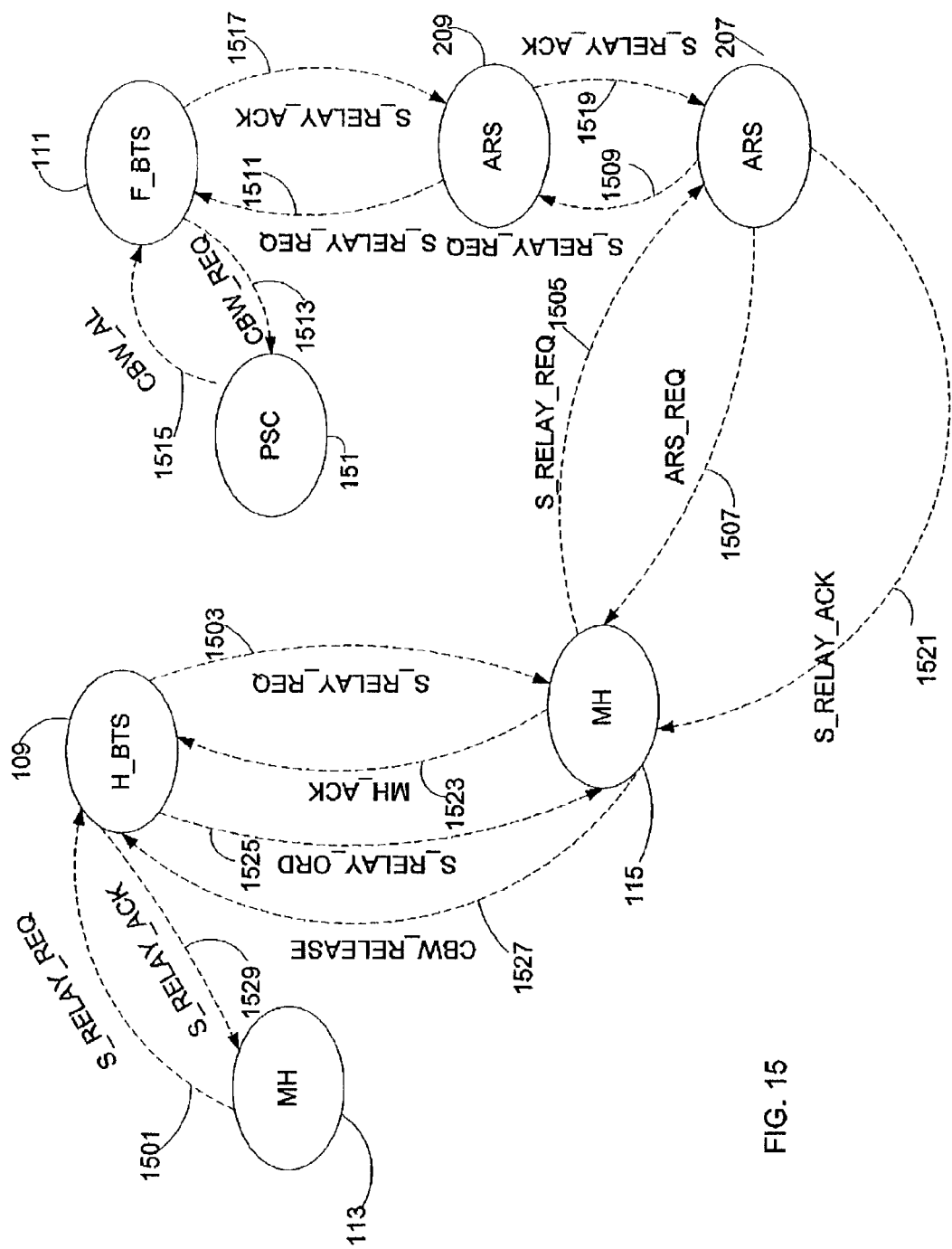
FIG. 15 shows a distributed signaling protocol scenario utilizing secondary relaying according to an embodiment of the invention.

FIG. 13 shows a distributed signaling protocol scenario utilizing primary relaying in accordance to a third embodiment of the invention. The signaling protocol scenario corresponds to the architecture that is shown in FIG. 2. The distributed signaling protocol scenarios that are shown in FIGS. 13 and 15 differ from the link-state based distributed signaling protocol scenarios that are shown in FIGS. 10 and 12 because ARS's do not maintain bandwidth information with distributed signaling.

MH 113 requests a call by sending CBW_REQ 1301 to BTS 109. As with FIG. 10 (link-state based distributed signaling utilizing primary signaling), BTS 109 sends CBW_REQ 1303 to PSC 151 in order to determine whether sufficient CBW is available to serve the call. PSC 151 returns CBW_REQ 1305 to BTS 109, indicating that there is not sufficient CBW. Message 1305 contains a list of candidate destination BTS's (which are foreign BTS's) with associated available CBW. BTS 109 forwards the information to MH 113 by sending CBW_INFO 1307. Consequently, MH 113 multicasts P_RELAY_REQ 1309 with the list of candidate BTS's and the associated CBW to neighboring ARS's (e.g. ARS 201).

When ARS 201 receives message 1309, ARS 201 accesses its routing table (data structure 1415 as described in FIG. 14) in order to determine if any of the destination BTS's is reachable. If so, ARS 201 returns ARS_ACK 1311. Because ARS's do not have bandwidth information of other ARS's, each ARS receiving message 1309 may attempt to establish a relaying path to a destination BTS in order to achieve a high probability of successfully establishing a relaying path. (With link-state base distributed signaling, only one ARS establishes a relaying path.) The establishment of a relaying path in FIG. 13 (messages 1313, 1315, 1317, 1319, 1321, and 1323) is similar to the link-state based distributed signaling protocol shown in FIGS. 10 and 12.

When ARS 201 has successfully established the relaying path, ARS 201 returns P_RELAY_ACK 1325 to MH 113. Because MH 113 can receive a plurality of responses, MH 113 selects the first response from the ARS's. In FIG. 13, the first responding ARS is ARS 201. MH 113 establishes the call through the relaying path that is provided by ARS 201. Also, MH 113 sends a message to the remaining ARS's that have responded in order to tear down the corresponding relaying paths.

Figure 14:
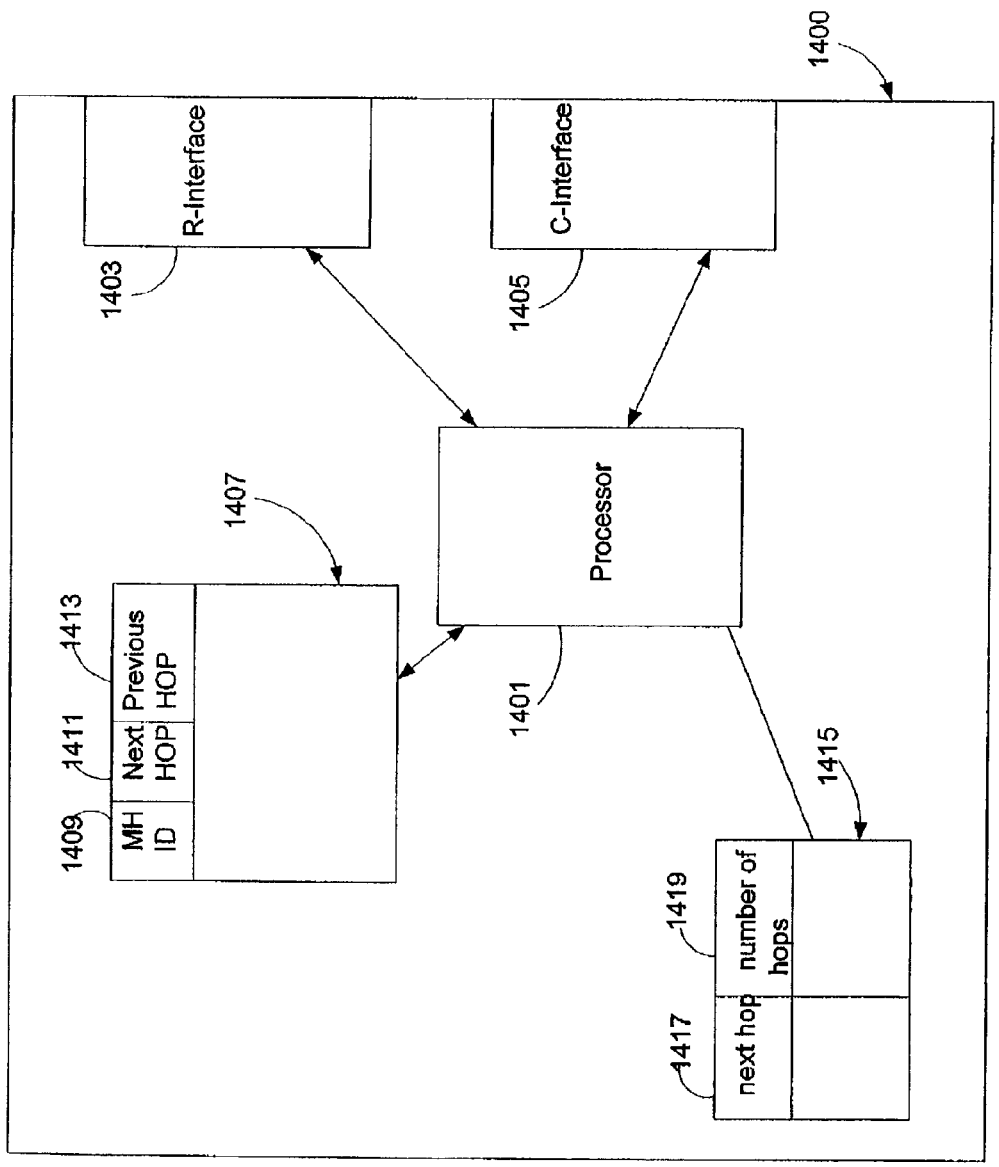
FIG. 14 shows apparatus of an ad hoc relaying station (ARS) that supports the protocol scenarios shown FIGS. 13 and 15.

FIG. 14 shows apparatus of ad hoc relaying station (ARS) 1400 that supports the signaling protocol scenarios in FIGS. 13 and 15. The apparatus shown for ARS 1400 is utilized by ARS 201, 203, 205, 207, and 209 in the embodiment. Processor 1401 corresponds to processor 601 and 1102; R-interface 1103 corresponds to R-interface 603 and 1103, C-interface 1405 corresponds to C-interface 1105 and 605; and data structure 1407 corresponds to data structures 607 and 1107. Data structure 1407 functions as a switching table for establishing a relaying path (corresponding to messages 1313, 1315, 1321, and 1323 in FIG. 13) in response to receiving a message to initiate the establishment of a relaying path (P_RELAY_REQ 1309 in FIG. 13). Data structure 1415 is indexed by an identification of a destination BTS. When ARS 201 receives R_RELAY_REQ 1309, which contains a list of destination BTS's, ARS 201 retrieves next hop entry 1417 and number of hops entry 1419 that is associated with a candidate BTS. In the embodiment, ARS 1400 attempts to establish a relaying path having the smallest number of hops (corresponding to entry 1419).

FIG. 15 shows a distributed signaling protocol scenario utilizing secondary relaying according to a variation of the third embodiment of the invention. The signaling protocol scenario corresponds to the architecture that is shown in FIG. 3. In the embodiment, secondary relaying is attempted after primary relaying was unsuccessful. However, other embodiments may utilize secondary relaying without attempting primary relaying. MH 113 initiates secondary relaying by sending S_RELAY_REQ 1501 to BTS 109. In the embodiment, BTS 109 has information about the candidate list and associated available CBW from the previous attempt for primary relaying (i.e. message 1305 as shown in FIG. 13). (However, with an alternative embodiment, BTS 109 may query PSC 151 if primary relaying is not attempted before secondary relaying.) BTS 109 includes this information in S_RELAY_REQ 1503 that is sent to all active mobile hosts (e.g., MH 115). Each active mobile host multicasts S_RELAY_REQ 1505 to neighboring ARS's (e.g. ARS 207). ARS 207 responds with ARS_REQ 1507 if any of the candidate BTS's (that is contained in a list of candidates in S_RELAY_REQ 1505) is reachable. ARS 207 attempts to establish a relaying path to a candidate BTS (corresponding to BTS 111). The associated messages are 1509, 1511 1513, 1515, 1517, and 1519 and corresponds to messages 1313, 1315, 1317, 1319, 1321, and 1323 in FIG. 13.

When an ARS has successfully established a relaying path, the ARS (e.g. ARS 207) returns S_RELAY_ACK 1521 to the requesting mobile host (e.g. MH 115). MH 115 selects the ARS that responds first (corresponding to ARS 207). MH 115 sends MH_ACK 1523 to BTS 109. Because a plurality of mobile hosts can respond with a MH_ACK message, BTS 109 selects the active mobile host that responds first. In FIG.

15, the first mobile host that responds is MH 115; thus BTS 109 sends S_RELAY_ORD 1525 to MH 115. Consequently, MH 115 redirects its current call through the relaying path established by ARS 207. BTS 109 instructs all other active mobile hosts to cancel any further action; consequently, a message to tear down relaying paths for the associated ARS's is multicasted.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A method comprising:
   determining that a first base transceiver station (BTS) does not have a channel to support a call for a wireless terminal, the first BTS utilizing a first frequency spectrum;
   receiving a request to initiate a relaying path for the wireless terminal;
   determining the relaying path that utilizes at least one relaying station and a second BTS, the at least one relaying station utilizing a second frequency spectrum comprising:
      determining an available bandwidth for each of the at least one relaying stations and for the second BTS;
      calculating a reciprocal of the available bandwidth for the each of the at least one relaying stations and the second BTS;
      summing the reciprocals; and
      selecting the relaying path that corresponds to a minimum sum of the reciprocals; and
   sending an instruction to the first BTS and to the second BTS in order to initiate an establishment of the relaying path.

2. The method of claim 1, further comprising minimizing a cost of the relaying path.

3. The method of claim 2, wherein the cost corresponds to a number of relaying stations that are configured for the relaying path.

4. The method of claim 1, further comprising maintaining bandwidth and topological information about an intergrated cellular and ad hoc relaying system.

5. The method of claim 1, further comprising:
   determining that the wireless terminal is within range of the first BTS; and
   determining that a second BTS is outside the range of the wireless terminal and that the second BTS has a channel available to support the call.

6. An apparatus comprising:
   an interface;
   a processor communicating with a plurality of base transceiver stations through the interface, the processor configured to:
      determine that a first base transceiver station (BTS) does not have a channel to support a call;
      receive a request to initiate a relaying path for the wireless terminal;
      send an instruction to the first BTS and to a second BTS in order to establish the relaying path; and
      determine the relaying path that utilizes at least one relaying station to the second BTS, wherein determining the relaying path comprises:
         determining an available bandwidth for each of the at least one relaying stations and for the second BTS;
         calculating a reciprocal of the available bandwidth for the each of the at least one relaying stations and the second BTS;
         summing the reciprocals; and
         selecting the relaying path that corresponds to a minimum sum of the reciprocals.

7. The apparatus of claim 6, further comprising:
   a data structure comprising bandwidth and topological information about an integrated cellular and ad-hoc relaying system, wherein the processor is configured to send an instruction to the first BTS and to the second BTS in order to establish the relaying path by minimizing a cost of the relaying path utilizing the bandwidth and topological information.

8. A computer-readable medium comprising computer executable instructions to enable a device to:
   determine that a first base transceiver station (BTS) does not have a channel to support a call;
   receive a request to initiate a relaying path for a wireless terminal;
   send an instruction to the first BTS and to a second BTS in order to initiate an establishment of the relaying path; and
   determine the relaying path that utilizes at least one relaying station to the second BTS, wherein determining the relaying path comprises:
      determining an available bandwidth for each of the at least one relaying stations and for the second BTS;
      calculating a reciprocal of the available bandwidth for the each of the at least one relaying stations and the second BTS.
      summing the reciprocals; and
   selecting the relaying path that corresponds to a minimum sum of the reciprocals.

* * * * *